Oct. 24, 1933.   R. E. FLANDERS   1,931,652
HYDRAULICALLY OPERATED FEED MECHANISM FOR HIGH SPEED MACHINES
Filed June 4, 1929   2 Sheets-Sheet 1
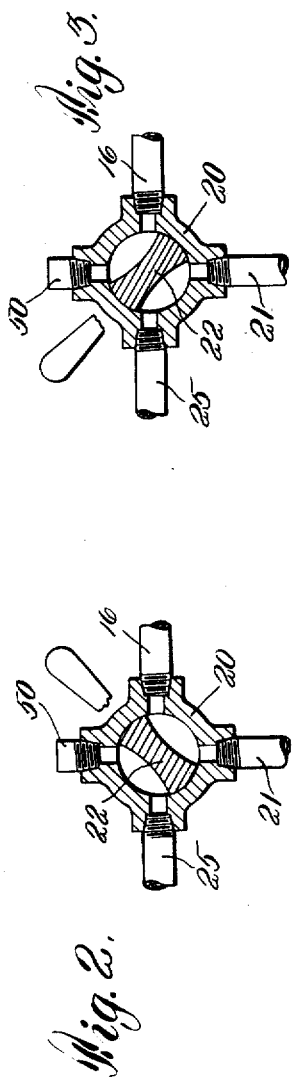
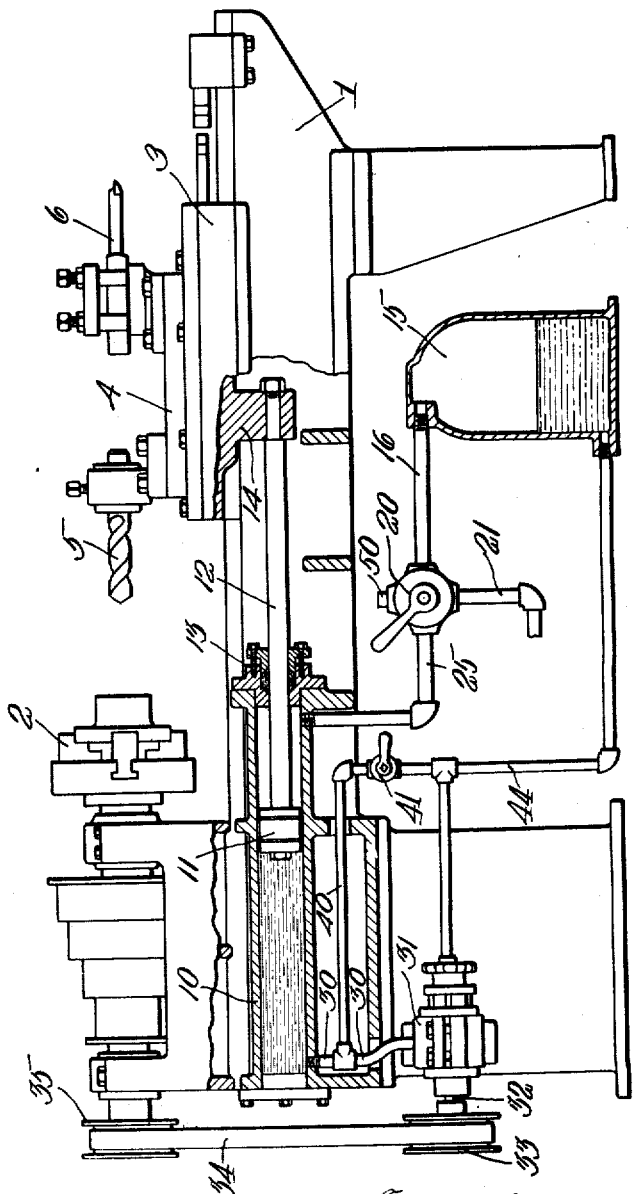
Inventor:
Ralph E. Flanders.
by Wright Brown Quinby & May
Attys.

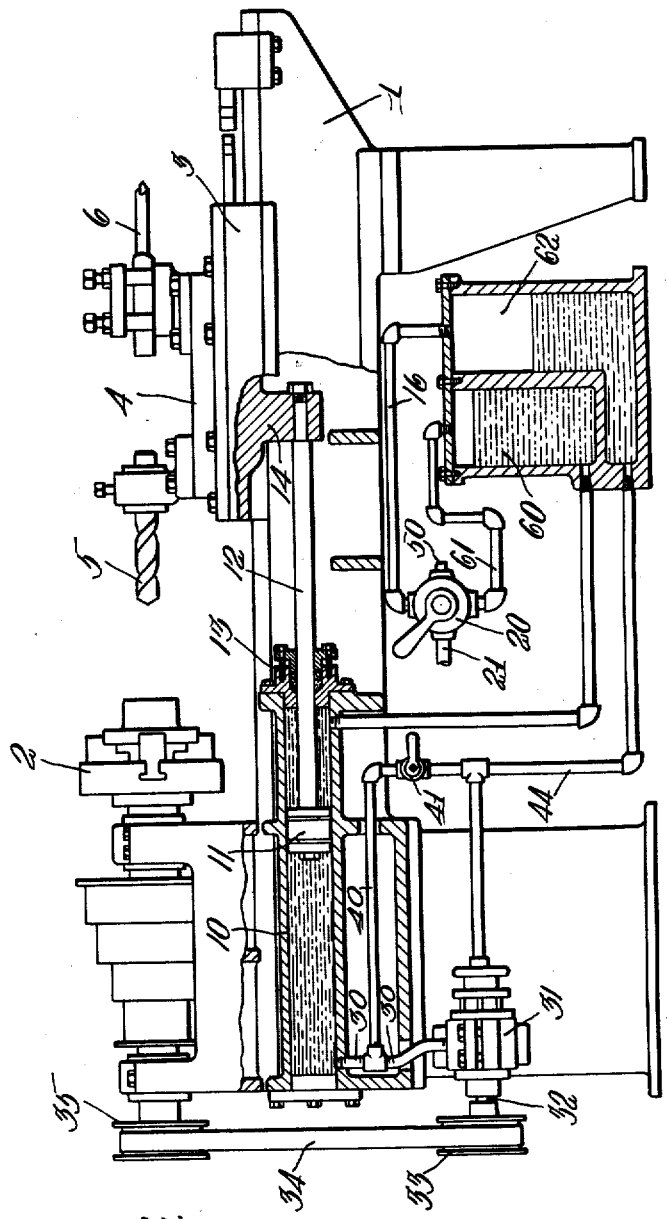

Patented Oct. 24, 1933

1,931,652

UNITED STATES PATENT OFFICE

1,931,652

HYDRAULICALLY OPERATED FEED MECHANISM FOR HIGH SPEED MACHINES

Ralph E. Flanders, Springfield, Vt., assignor to Jones & Lamson Machine Company, Springfield, Vt., a corporation of Vermont Application June 4, 1929. Serial No. 368,306

9 Claims. (Cl. 29—42)

In hydraulically operated feed mechanisms, more particularly intended for machine tools where it is desired to bring the tool up to the work with a fast motion and then to slow down the motion to the desired rate of tool feed during the time the tool is operating on the work, it is highly desirable that the transition from fast motion to slow feed should be made accurately without any overrun or rebound of the tool relative to the work. In the Hartness Patents No. 637,461 and No. 739,866 are shown hydraulic feed mechanisms in which the relatively slow feed of the tool slide toward the work holding chuck, which is the usual direction of operative feed, is produced by interposing a suitable controlled resistance to the flow of liquid under pressure to the feed mechanism. At the present time, however, the speeds of traverse of tools are very much higher (say, 30 feet or more a minute) than at the time the Hartness feed was developed, and it has been found in practice that with such high speeds the inertia of the mass of metal of the tool slide is sufficient to cause a momentary overrunning when the controlling resistance or "metering" device is suddenly interposed in the supply line to the feed mechanism, this being permitted by "cavitation" or the formation of a momentary vacuum in the supply system beyond the metering device.

One of the objects of the present invention is to so relate the elements of a mechanism of this character that cavitation cannot occur, thus to obtain accurate control of the speed of the tool slide at all speeds.

Further objects and advantages will appear from a more complete description of embodiments of the invention shown in the accompanying drawings in which Figure 1 shows in somewhat diagrammatic side elevation, partly broken away and in section, one form of the mechanism as applied to a turret lathe, although it should be understood that the invention is not limited in its application to any particular type of machine.

Figures 2 and 3 are sections through a controlling valve mechanism showing the parts in different positions.

Figure 4 is a view similar to Figure 1, but showing a modification.

Referring to Figure 1, at 1 is shown the bed of a turret lathe having a headstock having a chuck 2 for supporting work in the usual manner and a tool slide 3 movable toward and from the headstock. This tool slide carries a turret 4 supporting a plurality of tools as 5 and 6 which can be brought selectively into alinement with the axis of the headstock 2. Means for moving the tool slide toward and from the headstock are shown as comprising parts consisting of a cylinder 10 and a piston 11 riding in the cylinder. As shown the cylinder is fixed to the bed 1 of the lathe, while the piston is provided with a piston rod 12 extending out through one end of the cylinder 10 through the stuffing box 13 and fixed at its outer end to a portion 14 of the tool slide. The piston is designed to be moved axially of the cylinder to effect traverse of the tool slide with reference to the headstock. For this purpose means are provided for admitting fluid under pressure selectively to either end of the cylinder beyond the piston. For this purpose at 15 is shown a reservoir which is adapted to contain in its lower portion a suitable inelastic fluid under pressure. This fluid may, if desired, be oil. The reservoir 15 is entirely closed and has communicating therewith a pipe 16 leading from a valve 20. This valve is a four way valve, as shown best in Figures 2 and 3, having an intake pipe 21 through which air under pressure may be supplied to the interior of the valve casing. Within the casing is a plug 22, which can be adjusted so as to open communication from the pipe 21 either into the pipe 16 as shown in Figure 2, and thus into the chamber 15, or into a pipe 25, as shown in Figure 3, which leads to the right hand end of the cylinder 10 beyond the piston 11.

In this latter position of the valve force is being applied to the piston tending to cause the tool slide to approach the headstock and this is normally the operative feed motion of the tools relative to the work. The opposite end beyond the piston 11 contains inelastic fluid such as oil which is allowed to escape to the reservoir 15 when pressure is admitted to the right hand end of the cylinder, and this escape may be through a pipe 30 which leads to a metering device 31 of any suitable type which may, if desired, be similar to the device *f* shown in the Hartness Patent No. 637,461 to which reference has heretofore been made but which preferably and as shown, is constructed according to my application for Patent Serial No. 398,693, filed October 10, 1929, for metering device which represents an improvement over that shown in the Hartness patent. For the present purposes it is sufficient to state that this metering device which is preferably non-pumping as it is not required to pump against a pressure and thus can be of much simpler construction than can a variable pump permits the passage or flow of inelastic fluid therethrough at a maximum rate dependent on the speed of rotation of a shaft 32, which is shown as carrying a belt pulley 33 driven through a belt 34 from a pulley 35 on the headstock spindle. Thus the rate of flow of liquid through the metering device 31 is regulated in accordance with the speed of rotation of the headstock spindle and is independent of the pressure of the liquid which moves the slide. At 40 is shown a by-pass about this metering device, this by-pass being opened or closed by means of a control valve 41. By manipulation of this valve the escape of inelastic fluid or liquid on the operative direction of traverse of the tool slide may be passed through the metering device to effect a relatively slow feed motion of the tool, or through the by-pass 40, which permits a more rapid escape of the liquid and thus permits pressure applied through the valve 20 to move the tool slides with a relatively fast motion. The metering device and the by-pass both deliver to a pipe 44 which leads into the reservoir 15.

By positioning the metering device in the exhaust of the cylinder during the operative direction of stroke of the tool slide, this tool slide is positively controlled so that it cannot overrun should the metering device be suddenly interposed in the liquid exhaust, thus suddenly slowing down the speed of the tool slide and the piston. When it is desired to move the tool slide away from the work, the valve 20 is so manipulated as to direct pressure from the pipe 21 into the pipe 16, as shown in Figure 2, whereupon the liquid in the reservoir 15 is driven through the pipe 44 and the by-pass 40, the valve 41 then being in open position, and into the cylinder 10, while the air at the right hand side of the piston within the cylinder escapes through the pipe 25 and the valve exhaust 50.

In Figure 4 a modified construction is shown, in general following out the system of the Hartness Patent No. 769,866 hereinbefore mentioned, except that here also the metering device 31 and the by-pass 40 are in the exhaust from the cylinder 10 when the tool slide is given its motion in feeding direction. Instead, however, of admitting the elastic fluid pressure through the valve directly into the cylinder 10, an incompressible fluid or liquid derived from a reservoir 60 is employed, the valve 20 directing air under pressure through the pipe 61 into the upper portion of this reservoir. A reservoir 62 containing the incompressible liquid and with which the pipe 16 from the valve 20 communicates has the same function as the reservoir 15 shown in Figure 1, the only difference in the two arrangements being that in the construction of Figure 1 the air is led directly into the cylinder 10 to give the operative direction of traverse of the tool slide toward the headstock, while in the construction of Figure 4 air is directed into the chamber 60 and causes a liquid to pass into the cylinder 10. In both cases, however, it will be noted that the metering device and by-pass are positioned in the exhaust from the cylinder 10 during the operative or working direction of traverse of the tool slide, whereby cavitation is prevented, so that a transition from fast to slow speed may be accurately controlled even with high initial speed and with any desired mass in the tool slide.

Certain embodiments of this invention having thus been described, it should be evident to those skilled in the art that various changes and modifications might be made therein without departing from the spirit or scope of the invention as defined by the appended claims.

I claim:

1. The method of traversing and controlling the speed of feed of a tool relative to work, which comprises applying a moving force and opposing movement due to said force with an inelastic fluid, and controlling the rate of discharge of said fluid independently of the amount of said moving force.

2. The method of traversing and controlling the speed of feed of a tool relative to work, which comprises applying pressure through an elastic fluid to effect such movement, opposing such movement with an inelastic fluid, and controlling the rate of release of said inelastic fluid independent of the amount of said pressure.

3. In combination with a machine having a movable member, means for moving said member including pressure mechanism for moving said member in an operative direction, and an inelastic fluid mechanism for opposing such movement, said last mentioned mechanism including means for regulating the rate of flow of the inelastic fluid independently of its pressure to thereby regulate the rate of movement of said member.

4. A moving and controlling mechanism for a machine tool slide, comprising means for effecting movement of said slide in operative direction, said mechanism including inelastic fluid pressure mechanism for opposing such movement, said mechanism comprising cooperating parts consisting of a cylinder for containing such inelastic fluid and a piston in said cylinder, one of said parts being fixed and the other of said parts being operatively connected to said tool slide, a fluid metering device, and means for controlling the escape of inelastic fluid from said cylinder in response to pressure exerted thereon by said piston during operative movement of said slide selectively through or by-passing said metering device.

5. Moving and controlling mechanism for a tool slide or the like which comprises parts consisting of a cylinder and a piston in said cylinder, one of said parts being fixed and the other operatively connected to said slide, a reservoir, means for selectively admitting fluid pressure into said cylinder at one side of said piston to cause operative motion of said slide or into said reservoir, connections from said reservoir to the opposite side of said piston in said cylinder, said connections including a fluid metering device and a by-pass about said device, an inelastic fluid in said cylinder and in said connections, and means for selectively controlling the flow of inelastic fluid between said cylinder and said reservoir through said device or through said by-pass.

6. A lathe having a headstock and a tool slide, means for moving said tool slide axially of work held by said headstock, said means comprising parts consisting of a cylinder and a piston in said cylinder, one of said parts being fixed and the other of said parts being operatively connected to said tool slide, and means for controlling the supply of fluid pressure to the opposite ends of said piston, said moving means including a liquid metering device for opposing movement of said slide toward said headstock, a by-pass about said metering device, and means for selectively directing flow through said device or through said by-pass.

7. A lathe having a headstock, a rotary spindle, and a tool slide, means for moving said tool slide axially of work held by said headstock, and a non-pumping inelastic fluid mechanism for opposing movement of said slide toward said headstock, said mechanism including means for regulating the rate of flow of the inelastic fluid in accordance with the speed of rotation of said spindle to thereby regulate the rate of movement of said tool slide by the rate of rotation of said spindle.

8. A lathe having a headstock, a rotary spindle and a tool slide, means for moving said tool slide axially of work held by said headstock, said means comprising parts consisting of a cylinder and a piston in said cylinder, one of said parts being fixed and the other of said parts being operatively connected to said tool slide, and means for controlling the supply of fluid pressure to the opposite ends of said piston, said moving means including a metering device for opposing movement of said slide toward said headstock, said device having means for varying the maximum rate of flow of the liquid, means for controlling said rate varying means in accordance with the rate of speed of rotation of said spindle, a by-pass about said metering device and means for selectively directing flow through said device or through the said by-pass.

9. A lathe having a headstock, a rotary spindle, and a movable tool carrier, means for effecting operative and retracting motion to said tool carrier, and a non-pumping inelastic fluid mechanism for opposing operative movement of said tool carrier, said mechanism including means for regulating the rate of flow of the inelastic fluid in accordance with the speed of rotation of said spindle to thereby regulate the rate of operating movement of said tool carrier by the rate of rotation of said spindle.

RALPH E. FLANDERS.

DISCLAIMER 1,931,652.—*Ralph E. Flanders*, Springfield, Vt. HYDRAULICALLY OPERATED FEED MECHANISM FOR HIGH SPEED MACHINES. Patent dated October 24, 1933. Disclaimer filed April 4, 1936, by the assignee, *Jones & Lamson Machine Company*.

Hereby enters this disclaimer to claims 1, 3, 4, and 5 of said Letters Patent.
[*Official Gazette April 28, 1936*.]

for selectively directing flow through said device or through said by-pass.

7. A lathe having a headstock, a rotary spindle, and a tool slide, means for moving said tool slide axially of work held by said headstock, and a non-pumping inelastic fluid mechanism for opposing movement of said slide toward said headstock, said mechanism including means for regulating the rate of flow of the inelastic fluid in accordance with the speed of rotation of said spindle to thereby regulate the rate of movement of said tool slide by the rate of rotation of said spindle.

8. A lathe having a headstock, a rotary spindle and a tool slide, means for moving said tool slide axially of work held by said headstock, said means comprising parts consisting of a cylinder and a piston in said cylinder, one of said parts being fixed and the other of said parts being operatively connected to said tool slide, and means for controlling the supply of fluid pressure to the opposite ends of said piston, said moving means including a metering device for opposing movement of said slide toward said headstock, said device having means for varying the maximum rate of flow of the liquid, means for controlling said rate varying means in accordance with the rate of speed of rotation of said spindle, a by-pass about said metering device and means for selectively directing flow through said device or through the said by-pass.

9. A lathe having a headstock, a rotary spindle, and a movable tool carrier, means for effecting operative and retracting motion to said tool carrier, and a non-pumping inelastic fluid mechanism for opposing operative movement of said tool carrier, said mechanism including means for regulating the rate of flow of the inelastic fluid in accordance with the speed of rotation of said spindle to thereby regulate the rate of operating movement of said tool carrier by the rate of rotation of said spindle.

RALPH E. FLANDERS.

DISCLAIMER 1,931,652.—*Ralph E. Flanders*, Springfield, Vt. HYDRAULICALLY OPERATED FEED MECHANISM FOR HIGH SPEED MACHINES. Patent dated October 24, 1933. Disclaimer filed April 4, 1936, by the assignee, *Jones & Lamson Machine Company*.

Hereby enters this disclaimer to claims 1, 3, 4, and 5 of said Letters Patent.
[*Official Gazette April 28, 1936.*]

DISCLAIMER 1,931,652.—*Ralph E. Flanders*, Springfield, Vt. HYDRAULICALLY OPERATED FEED MECHANISM FOR HIGH SPEED MACHINES. Patent dated October 24, 1933. Disclaimer filed April 4, 1936, by the assignee, *Jones & Lamson Machine Company*.

Hereby enters this disclaimer to claims 1, 3, 4, and 5 of said Letters Patent.

[*Official Gazette April 28, 1936.*]